US009176556B2

(12) United States Patent
Jing et al.

(10) Patent No.: US 9,176,556 B2
(45) Date of Patent: Nov. 3, 2015

(54) SERIAL BUS VOLTAGE COMPENSATION

(71) Applicant: TEXAS INSTRUMENTS INCORPORATED, Dallas, TX (US)

(72) Inventors: Weibing Jing, Beijing (CN); Jennifer (Xiaojun) Xu, Beijing (CN); Lingling Dong, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 118 days.

(21) Appl. No.: 14/144,985

(22) Filed: Dec. 31, 2013

(65) Prior Publication Data

US 2015/0100812 A1 Apr. 9, 2015

Related U.S. Application Data

(63) Continuation of application No. PCT/CN2013/084826, filed on Oct. 8, 2013.

(51) Int. Cl.
*G06F 1/26* (2006.01)
*G06F 1/28* (2006.01)
*G06F 1/30* (2006.01)

(52) U.S. Cl.
CPC ........... *G06F 1/266* (2013.01); *G06F 1/28* (2013.01); *G06F 1/30* (2013.01)

(58) Field of Classification Search
CPC ............. G06F 1/26; G06F 1/266; G06F 1/28; G06F 1/30; G06F 1/305
See application file for complete search history.

(56) References Cited

U.S. PATENT DOCUMENTS

| 6,147,682 A * | 11/2000 | Kim .............................. 345/211 |
| 2006/0158806 A1* | 7/2006 | Robertson ....................... 361/62 |
| 2013/0055002 A1* | 2/2013 | Brooks et al. ................. 713/340 |
| 2013/0227307 A1 | 8/2013 | Knowlton et al. |

FOREIGN PATENT DOCUMENTS

CN 201629569 11/2010

* cited by examiner

*Primary Examiner* — Dennis M Butler
(74) *Attorney, Agent, or Firm* — Alan A. R. Cooper; Frank D. Cimino

(57) ABSTRACT

A serial bus network includes a voltage regulator, a plurality of power switches, and a voltage monitor. The voltage regulator provides power to a plurality of serial buses. Each of the serial buses provides power from the voltage regulator to a device coupled to the serial bus. Each of the power switches switches power from the voltage regulator to one of the serial buses, and includes an input terminal coupled to a voltage regulator output, and an output terminal coupled to one of the serial buses. The voltage monitor is coupled to the voltage regulator and to the output terminal of each of the power switches. The voltage monitor compares bus voltages at the output terminals of the power switches, identifies a lowest of the bus voltages, and adjusts the voltage regulator output voltage such that the identified lowest of the bus voltages is within a predetermined operational voltage range.

20 Claims, 4 Drawing Sheets

SERIAL BUS VOLTAGE COMPENSATION

CROSS-REFERENCE TO RELATED APPLICATION

The present application is a continuation of and claims priority to International Patent Application No. PCT/CN2013/084826 filed on Oct. 8, 2013, which is hereby incorporated herein by reference in its entirety.

BACKGROUND

Computers and other electronic devices commonly use serial interfaces to provide for transfer of data between connected devices. The universal serial bus (USB) is one of a variety of serial buses used to interface electronic devices. A USB system generally consists of one or more host devices and one or more peripheral devices connected in a tiered-star topology. Host devices include, for example, computers, smartphones, video game consoles, and other computing devices. Peripheral devices include, for example, flash drives, printers, keyboards, smartphones, cameras, tablets, and various other devices. USB operational standards are defined in a series of specifications (e.g., USB 2.0 specification, USB 3.0 specification, etc.)

USB interfaces can supply power to peripheral devices, and many devices connected to a USB interface are powered via the serial bus rather than via a power source associated with device. A USB compliant interface provides 5 volts (V) to connected devices through the connecting cable. To facilitate provision of power and data, a USB connecting cable typically includes a power line, a ground line, and differential data lines.

SUMMARY

Apparatus for controlling voltage distribution in a serial bus network is disclosed herein. In one implementation a serial bus network includes a voltage regulator, a plurality of power switches, and a voltage monitor. The voltage regulator is configured to provide power to a plurality of serial buses. Each of the serial buses is configured to provide power from the voltage regulator to a device coupled to the serial bus and to serially transfer data between devices coupled to the serial bus. Each of the power switches is configured to switch power from the voltage regulator to one of the serial buses. Each of the power switches includes a switch input terminal coupled to an output of the voltage regulator, and a switch output terminal coupled to one of the serial buses. The voltage monitor is coupled to the voltage regulator and coupled to the output terminal of each of the power switches. The voltage monitor is configured to compare bus voltages at the output terminals of the power switches, to identify a lowest of the bus voltages via the comparison, and to adjust output voltage of the voltage regulator such that the identified lowest of the bus voltages is within a predetermined operational voltage range.

In another implementation, a serial bus voltage control system includes a voltage regulator, a plurality of power switches, and a voltage monitor. The voltage regulator is configured to provide power to a plurality of serial buses. Each of the serial buses is configured to provide power from the voltage regulator to a device coupled to the serial bus and to serially transfer data between devices coupled to the serial bus. Each of the power switches is configured to switch power from the voltage regulator to one of the serial buses. Each of the power switches includes a switch input terminal coupled to an output of the voltage regulator, a switch output terminal coupled to one of the serial buses, and a voltage control loop. The voltage monitor is coupled to the voltage regulator and coupled to the output terminal of each of the power switches. The voltage monitor is configured to adjust the output voltage of the voltage regulator based on a reference voltage provided from one of the switch output terminals. The voltage control loop is configured to reduce the bus voltage at the output terminal of the power switch based on the adjusted output voltage of the voltage regulator causing the voltage at the output terminal to exceed an upper limit of a predetermined operational voltage range for the serial bus.

In yet another implementation, a serial bus power delivery system includes a voltage regulator configured to provide power to a plurality of serial buses. Each of the serial buses is configured to provide power from the voltage regulator to a device coupled to the serial bus and to serially transfer data between devices coupled to the serial bus. Each of the power switches is configured to switch power from the voltage regulator to one of the serial buses. Each of the power switches includes a switch input terminal coupled to an output of the voltage regulator, and a switch output terminal coupled to one of the serial buses. The voltage monitor is coupled to the voltage regulator and coupled to the output terminal of each of the power switches. The voltage monitor includes a lowest voltage selector and a lowest voltage limiter. The lowest voltage selector is configured to compare bus voltages at the output terminals of the power switches, to identify a lowest of the bus voltages via the comparison, and to apply the identified lowest of the bus voltages to adjust output voltage of the voltage regulator such that the identified lowest of the bus voltages is within a predetermined operational voltage range. The lowest voltage limiter is configured to determine whether the identified lowest of the bus voltages is too low to be applied to adjust the output voltage of the voltage regulator.

BRIEF DESCRIPTION OF THE DRAWINGS

For a detailed description of exemplary aspects of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on"

is intended to mean "based at least in part on." Therefore, if X is based on Y, X may be based on Y and any number of additional factors.

DETAILED DESCRIPTION

The following discussion is directed to various aspects of a serial bus power delivery and control system. Although one or more of the implementations disclosed may be preferred, the various implementations should not be interpreted, or otherwise used, as limiting the scope of the disclosure, including the claims. In addition, one skilled in the art will understand that the following description has broad application, and the discussion of any implementation is meant only to be exemplary, and is not intended to intimate that the scope of the disclosure, including the claims, is limited to that implementation.

As increasingly advanced devices are attached to serial buses, such as a universal serial bus (USB), the power demands of the devices are also increasing. For example, some devices that attach to USB may draw up to three amperes of charging current. As the current draw of devices increases, the voltage drop across components that switch or route power to the serial bus also increases. In some situations, the voltage drop may cause the voltage provided to the bus device to fall outside the operational voltage range of the device and/or the voltage specification defined by a standard governing the serial bus.

The serial bus voltage control system disclosed herein maintains, within a predetermined operational voltage range, the bus voltage downstream of each of the power switches that route power to an instance of the serial bus. The control system monitors the voltage at each power switch output, and adjusts the input voltage provided to the switches based on the lowest voltage present at any power switch output. Accordingly, the voltage at the input of each power switch is sufficient to provide voltage within the operational voltage specification at the output of each of the power switches. Each of the power switches includes a control loop that ensures that the voltage output by the switch does not exceed the maximum operational voltage specification.

Figure 1:
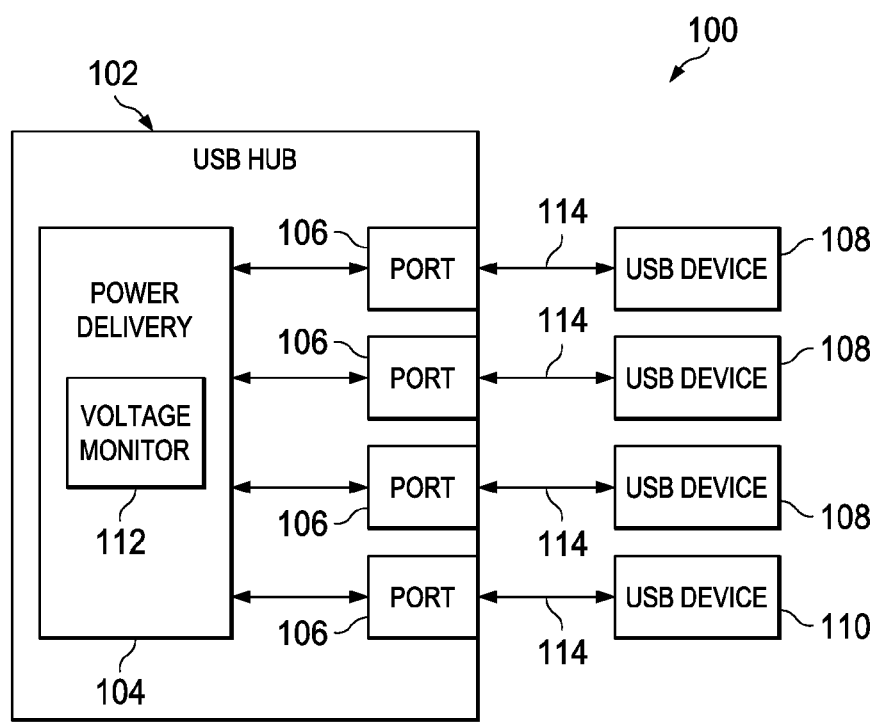
FIG. 1 shows a block diagram of a system including devices powered via serial bus in accordance with principles disclosed herein.

FIG. 1 shows a block diagram of a system 100 including devices powered via serial bus in accordance with principles disclosed herein. The system 100 is illustrated as a USB system, but the voltage control/delivery system disclosed may be applied to control serial bus voltage in any of a variety of serial bus systems. The system 100 includes a USB hub 102 and a plurality of USB devices 108, 110. For example, USB device 110 may be a USB host device and USB devices 108 may be USB peripheral devices. The USB hub 102 is coupled to the USB devices 108, 110 via USB instances 114. Some of the USB devices 108 may be powered or charged via the buses 114.

The USB hub 102 includes ports 106, and power delivery/control system 104. The ports 106 provide for connection of the USB hub 104 to cabling or other conductive media of each USB instance 114. The power delivery system 104 provides power to each of the USB instances 114 for use by the USB devices 108. The power delivery system 104 include a voltage monitor 112 that monitors the voltage provided to each of the USB instances 114 and adjusts the voltage such that voltage provided to none of the USB instances 114 falls below a minimum operational voltage threshold. Thus, the power delivery system 104 compensates for the maximum voltage drop present across components of the USB hub 102, and ensures that the voltage provided to each of the USB devices 108 falls within the operating specification for USB devices 108 and the USB standard.

While as a matter of convenience the power delivery/control system 104 has been illustrated in FIG. 1 as providing and controlling power to four serial buses 114, in practice various implementations of the power delivery/control system 104 may provide and control power to any number of serial buses 114.

Figure 2:
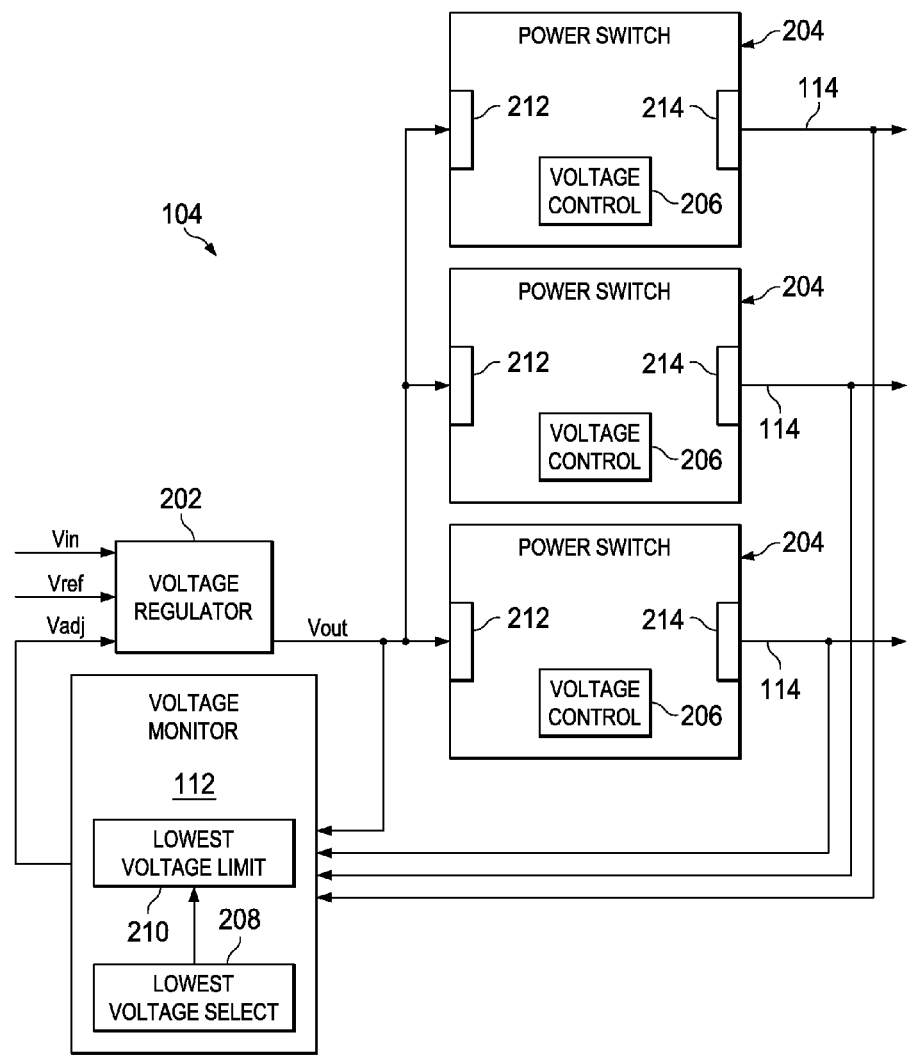
FIG. 2 shows a block diagram of a power delivery and control system for a serial bus in accordance with principles disclosed herein.

FIG. 2 shows a block diagram of the power delivery and control system 104. The power delivery system 104 includes a voltage regulator 202, the voltage monitor 112, and a plurality of power switches 204. The voltage regulator 202 provides power to the power switches 204 at a predetermined voltage. The voltage regulator 202 may include a linear regulator and/or a switching regulator to control the voltage at the output of the regulator 202. Power is provided to the voltage regulator 202 via the input VIN. A reference voltage input VREF sets the predetermined output voltage of the voltage regulator 202. Input signal VADJ is provided to the voltage regulator 202 to adjust the output voltage of the regulator 202.

The output of the voltage regulator 202 is provided to the power switches 204 via input terminals 212. The power switches 204 switch power from the voltage regulator 202 to the output terminals 214 of the power switches and the serial buses 114. Each of the power switches 204 includes a switch, such as one or more switching transistors, that connects the output of the voltage regulator 202 to the serial bus 114. The power switch 204 also includes a voltage control loop 206. The voltage control loop 206 provides an additional control mechanism for setting the output voltage of the switch 204. For example, if the output voltage of the voltage regulator 202 is such that the voltage applied to the serial bus 114, via the switch 204, exceeds a maximum threshold value, then the voltage control loop 206 may reduce the output voltage of the switch 204 to ensure that the voltage provided to the serial bus 114 is within a predetermined operational range.

The voltage monitor 112 monitors the voltage on each of the serial buses 114 and provides control signal VADJ to the voltage regulator 202. The voltage monitor 112 includes a lowest voltage selector 208 and lowest voltage limiter 210. The lowest voltage selector 208 compares the voltages present on each of the serial buses 114 and determines which of the serial bus voltages is lowest. The voltage monitor 112 generates signal VADJ to adjust the output voltage (VOUT) of the voltage regulator 202 based on the identified lowest serial bus voltage, and thereby compensates for voltage drop across the power switch 204, and other power routing components, associated with the identified lowest serial bus voltage. The lowest voltage selector 208 may include one or more comparators to compare the voltages on the serial buses 114, and switches or a multiplexer to route the identified lowest serial bus voltage to the lowest voltage limiter 210.

The lowest voltage limiter 210 restricts the range of the VADJ signal applied to adjust the output voltage of the voltage regulator 202. In one implementation, the lowest voltage limiter 210 compares the lowest serial bus voltage identified by the lowest voltage selector 208 to the voltage output of the voltage regulator 202. If the voltage regulator output voltage exceeds the lowest serial bus voltage by more than a predetermined amount, then the voltage monitor 112 generates VADJ based on the voltage regulator output voltage rather than based on the lowest serial bus voltage. Thus, if the lowest serial bus voltage is too low (e.g., as a result of a short circuit or other fault), the output voltage of the voltage regulator 202 is not changed based on the excessively low bus voltage.

If the regulator output voltage does not exceed the lowest serial bus voltage by more than the predetermined value, then the voltage monitor 112 generates VADJ based on the identified lowest serial bus voltage. VADJ, when based on the lowest serial bus voltage, causes the voltage regulator 202 to change (e.g., increase) its output voltage to a level that causes the voltage at the output terminal 214 of the switch 204 associated with the lowest serial bus voltage to exceed, or at least meet, the minimum operating voltage threshold for the serial bus 114. Thus, the voltage monitor 112 compensates for voltage drop across the power switch 204, and ensures that the voltage regulator 202 provides adequate voltage to drive all of the serial buses 114 to a voltage that is within the operational voltage specification for the serial buses 114.

The lowest voltage limiter 210 may include a comparator to compare the identified lowest serial bus voltage to the voltage regulator output voltage, and switches or a multiplexer to route one of the lowest bus voltage and the voltage regulator output voltage to the voltage regulator 202 based on the comparison. For example, if the voltage regulator output voltage (or a voltage derived from the voltage regulator output voltage) exceeds the identified lowest serial bus voltage (or a voltage derived from the identified lowest serial bus voltage), then the lowest voltage limiter may provide the voltage regulator output voltage (or a voltage derived from the voltage regulator output voltage) as VADJ. Otherwise the lowest voltage limiter may provide the identified lowest serial bus voltage (or a voltage derived from the identified lowest serial bus voltage) as VADJ.

Figure 3:
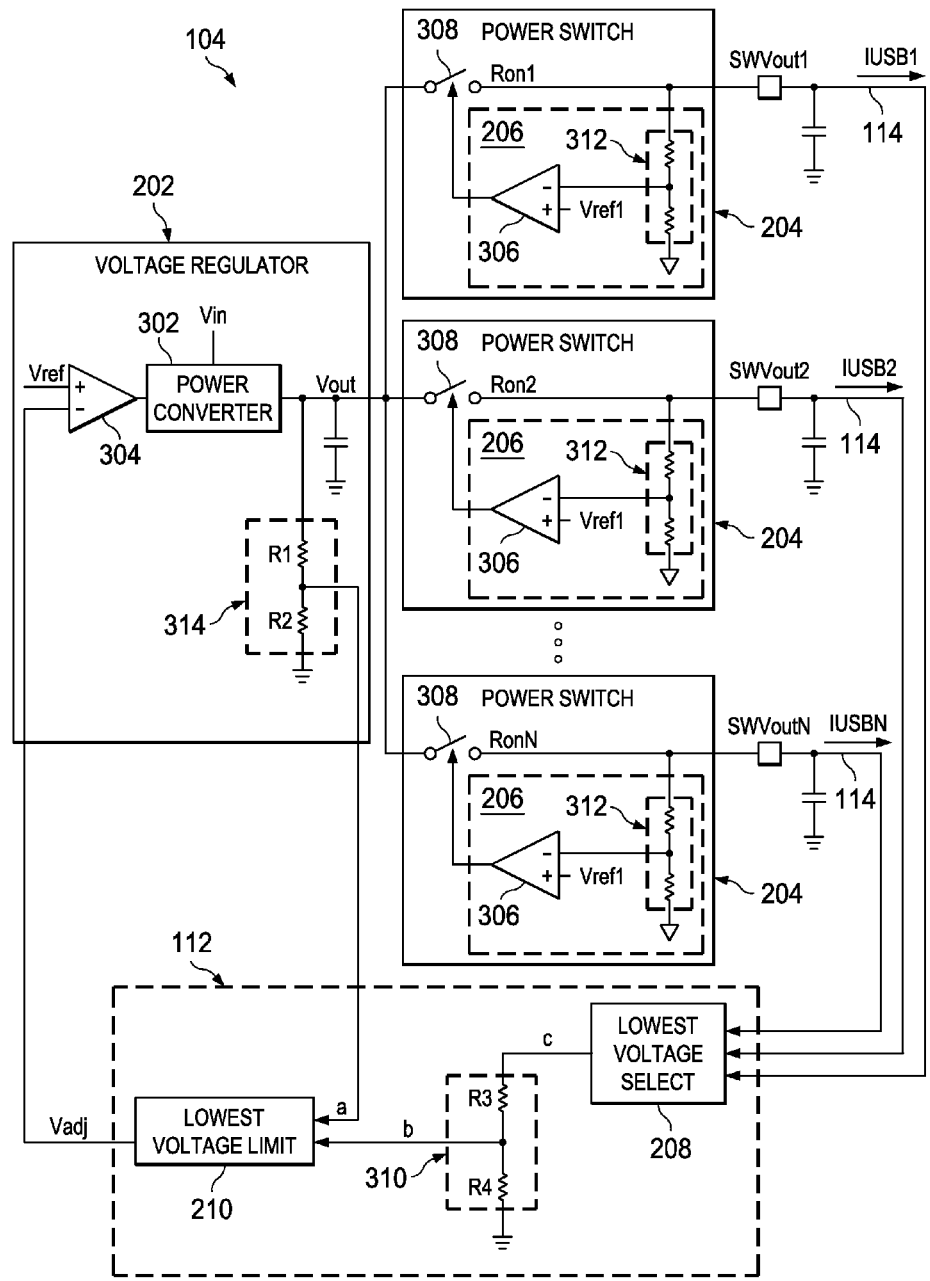
FIGS. 3 and 4 show schematic diagrams for a serial bus power control system in accordance with principles disclosed herein.

FIG. 3 shows a schematic diagram for the serial bus power control system 104. FIG. 3 shows that the voltage regulator 202 includes a power converter 302. The power converter 302 may be a switching voltage regulator that generates output voltage VOUT from input voltage VIN. The operation of the power converter 302 is controlled by error amplifier 304. Error amplifier 304 compares the reference voltage VREF to the adjustment voltage VADJ generated by the voltage monitor 112. Accordingly, the power converter 302 generates output voltage VOUT at a voltage level that moves VADJ towards VREF.

The voltage control loop 206, of each power switch 204, includes a voltage scaling circuit 312 (e.g., resistors arranged as a voltage divider) and an error amplifier 306. The error amplifier 306 compares the voltage at the output terminal of the power switch 204 to a reference voltage VREF1. The voltage reference VREF1 may the same voltage VREF provided to the voltage regulator 202, or may be a different voltage. For example VREF1 may be the maximum voltage specified for application to the serial bus 114, and VREF may be the nominal voltage specified for application to the serial bus 114. The error amplifier 306 may control the voltage at the output terminal of the power switch 204 by opening the switch 308 if the voltage at the output terminal of the power switch 204 exceeds VREF1. Other implementations of the voltage control loop 206 may apply a different technique to control the voltage at the output of the power switch 204 (e.g., a low drop-out linear regulator).

The voltage monitor 112 includes a voltage scaling circuit 310 that scales the identified lowest serial bus voltage for provision to the lowest voltage limiter 210. Similarly, the voltage regulator 202 includes a voltage scaling circuit 314 that scales the output voltage of the voltage regulator 202 for provision to the lowest voltage limiter 210. Accordingly, the lowest voltage limiter 210 compares the scaled versions of the lowest bus voltage and the voltage regulator output voltage and generates VADJ based on the scaled voltages. For example, VADJ may be either the scaled lowest bus voltage or the scaled voltage regulator output voltage.

Figure 4:
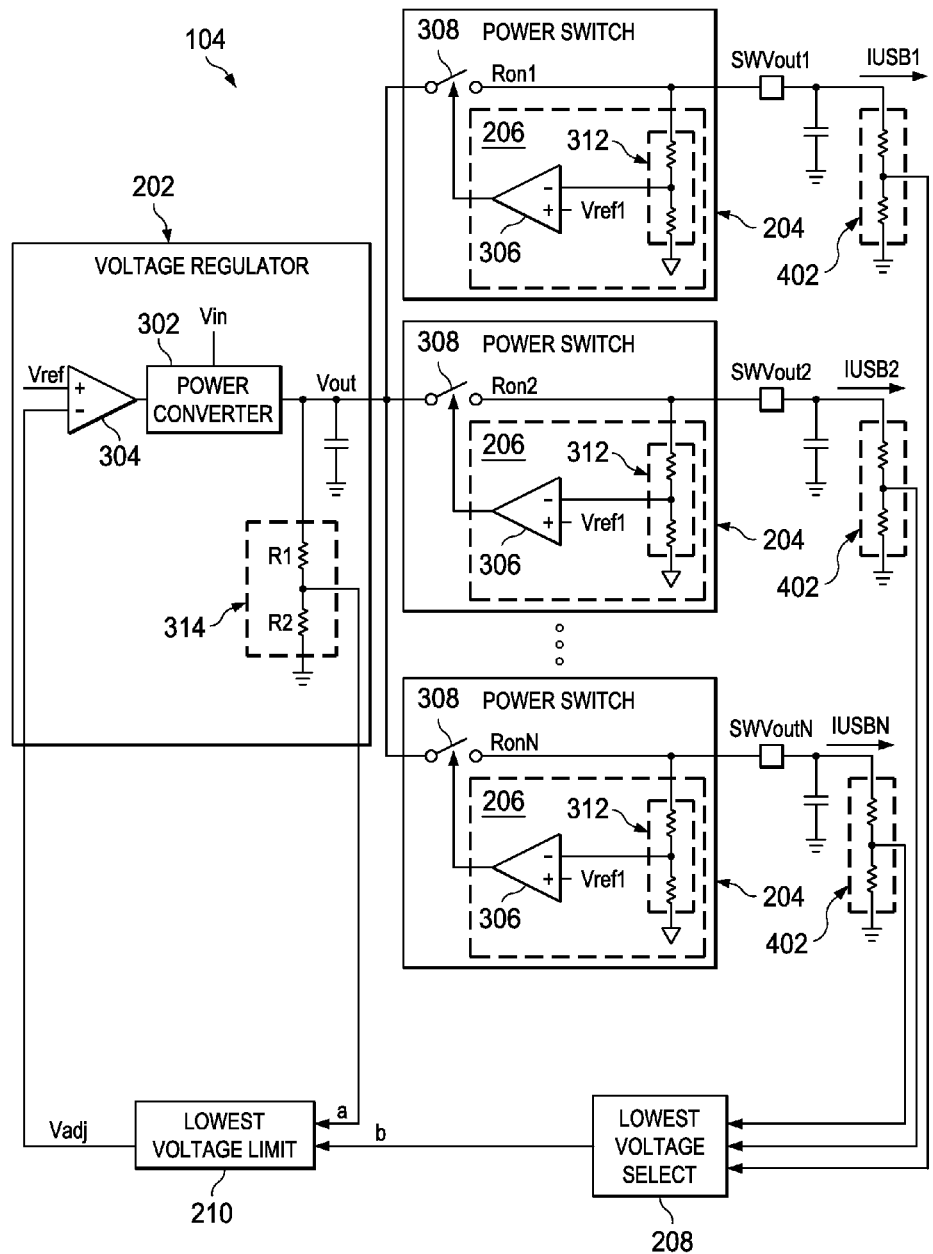

FIG. 4 shows a schematic diagram for another implementation of the serial bus power control system 104. The implementation of FIG. 4 is generally similar to the implementation of FIG. 3 with the exception that the implementation of FIG. 4 includes a voltage scaling circuit 402 at the output of each power switch 204 rather than at the output of the lowest voltage selector 208 as shown in FIG. 3.

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A serial bus network, comprising:
a voltage regulator configured to provide power to a plurality of serial buses;
wherein each of the serial buses is configured to provide power from the voltage regulator to a device coupled to the serial bus and to serially transfer data between devices coupled to the serial bus;
a plurality of power switches, each configured to switch power from the voltage regulator to one of the serial buses, each of the power switches comprising:
a switch input terminal coupled to an output of the voltage regulator; and
a switch output terminal coupled to one of the serial buses, and;
a voltage monitor coupled to the voltage regulator and coupled to the output terminal of each of the power switches; wherein the voltage monitor is configured to:
compare bus voltages at the output terminals of the power switches;
identify a lowest of the bus voltages via the comparison;
adjust output voltage of the voltage regulator such that the identified lowest of the bus voltages is within a predetermined operational voltage range.

2. The network of claim 1, wherein the voltage monitor is configured to:
compare the identified lowest of the bus voltages to the output voltage of the voltage regulator;
not apply identified lowest of the bus voltages to adjust the output voltage of the voltage regulator based on the identified lowest of the bus voltages being less than the output voltage of the voltage regulator by more than a predetermined maximum difference amount.

3. The network of claim 2, further comprising a scaling network coupled to the voltage regulator, and configured to scale the output voltage of the voltage regulator and provide the scaled regulator output voltage to the voltage monitor for comparison to the identified lowest of the bus voltages.

4. The network of claim 3, further comprising a scaling network configured to down scale the identified lowest of the bus voltages for comparison to the scaled regulator output voltage.

5. The network of claim 1, wherein each of the power switches comprises a voltage control loop configured to reduce the bus voltage at the output terminal of the power switch based on the output voltage of the voltage regulator causing the voltage at the output terminal to exceed an upper limit of the predetermined operational voltage range.

6. The network of claim 1, wherein each of the plurality of serial buses is a universal serial bus.

7. The network of claim 1, further comprising a plurality of voltage scaling circuits, each of the scaling circuits coupled to a the output terminal of one of the power switches;
   wherein the scaling circuit scales the bus voltage at the output terminal and provides the scaled bus voltage to the voltage monitor for comparison.

8. A serial bus voltage control system, comprising:
   a voltage regulator configured to provide power to a plurality of serial buses;
      wherein each of the serial buses is configured to provide power from the voltage regulator to a device coupled to the serial bus and to serially transfer data between devices coupled to the serial bus;
   a plurality of power switches, each configured to switch power from the voltage regulator to one of the serial buses, each of the power switches comprising:
      a switch input terminal coupled to an output of the voltage regulator; and
      a switch output terminal coupled to one of the serial buses;
      a voltage control loop; and;
   a voltage monitor coupled to the voltage regulator and coupled to the output terminal of each of the power switches; wherein the voltage monitor is configured to adjust the output voltage of the voltage regulator based on a reference voltage provided from one of the switch output terminals;
   wherein the voltage control loop is configured to reduce the bus voltage at the output terminal of the power switch based on the adjusted output voltage of the voltage regulator causing the voltage at the output terminal to exceed an upper limit of a predetermined operational voltage range for the serial bus.

9. The system of claim 8, wherein the voltage monitor is configured to:
   compare bus voltages at the output terminals of the power switches;
   identify a lowest of the bus voltages via the comparison;
   apply the identified lowest of the bus voltages as the reference voltage; and
   adjust output voltage of the voltage regulator such that the identified lowest of the bus voltages is within the predetermined operational voltage range.

10. The system of claim 9, wherein the voltage monitor is configured to:
   compare the identified lowest of the bus voltages to the output voltage of the voltage regulator; and
   apply the output voltage of the voltage regulator, and not apply the identified lowest of the bus voltages, to adjust the output voltage of the voltage regulator based on the output voltage of the voltage regulator exceeding the identified lowest of the bus voltages being more than a predetermined maximum difference amount.

11. The system of claim 10, further comprising a voltage divider coupled to the voltage regulator, and configured to:
   scale the output voltage of the voltage regulator; and
   provide the scaled regulator output voltage to the voltage monitor for comparison to the identified lowest of the bus voltages.

12. The system of claim 11, further comprising a voltage divider configured to down scale the identified lowest of the bus voltages for comparison to the scaled regulator output voltage.

13. The system of claim 8, wherein each of the plurality of serial buses is a universal serial bus.

14. The system of claim 8, further comprising a plurality of voltage dividers, each of the voltage dividers coupled to the output terminal of one of the power switches; wherein the voltage divider scales the bus voltage at the output terminal and provides the scaled bus voltage to the voltage monitor for comparison.

15. A serial bus power delivery system, comprising:
   a voltage regulator configured to provide power to a plurality of serial buses;
      wherein each of the serial buses is configured to provide power from the voltage regulator to a device coupled to the serial bus and to serially transfer data between devices coupled to the serial bus;
   a plurality of power switches, each configured to switch power from the voltage regulator to one of the serial buses, each of the power switches comprising:
      a switch input terminal coupled to an output of the voltage regulator; and
      a switch output terminal coupled to one of the serial buses, and;
   a voltage monitor coupled to the voltage regulator and coupled to the output terminal of each of the power switches, the voltage monitor comprising:
      a lowest voltage selector; and
      a lowest voltage limiter;
   wherein the lowest voltage selector is configured to:
      compare bus voltages at the output terminals of the power switches;
      identify a lowest of the bus voltages via the comparison; and
      apply the identified lowest of the bus voltages to adjust output voltage of the voltage regulator such that the identified lowest of the bus voltages is within a predetermined operational voltage range; and
   wherein the lowest voltage limiter is configured to determine whether the identified lowest of the bus voltages is too low to be applied to adjust the output voltage of the voltage regulator.

16. The system of claim 15, wherein the lowest voltage limiter is configured to:
   compare the identified lowest of the bus voltages to the output voltage of the voltage regulator; and
   apply the output voltage of the voltage regulator, and not apply the identified lowest of the bus voltages, to adjust the output voltage of the voltage regulator based on the output voltage of the voltage regulator exceeding the identified lowest of the bus voltages being more than a predetermined maximum difference amount.

17. The system of claim 16, wherein each of the power switches comprises a voltage control loop configured to reduce the bus voltage at the output terminal of the power switch based on the output voltage of the voltage regulator causing the voltage at the output terminal to exceed an upper limit of the predetermined operational voltage range.

18. The system of claim 17, further comprising a voltage divider coupled to the voltage regulator, and configured to:
   scale the output voltage of the voltage regulator; and
   provide the scaled regulator output voltage to the lowest voltage limiter for comparison to the identified lowest of the bus voltages.

19. The system of claim 18, further comprising a voltage divider configured to down scale the identified lowest of the bus voltages for comparison to the scaled regulator output voltage.

20. The system of claim 18, further comprising a plurality of voltage dividers, each of the voltage dividers coupled to the output terminal of one of the power switches; wherein each voltage divider scales the bus voltage at the output terminal and provides the scaled bus voltage to the lowest voltage selector for comparison.

* * * * *